(12) United States Patent
Hays et al.

(10) Patent No.: US 6,476,522 B1
(45) Date of Patent: Nov. 5, 2002

(54) METHOD AND APPARATUS TO CONTROL POWER DRAWN BY A MEASUREMENT DEVICE

(75) Inventors: Paul J. Hays, Lafayette, CO (US); William M. Mansfield, Lafayette, CO (US); Brian T. Smith, Johnstown, CO (US)

(73) Assignee: Micro Motion, Inc., Boulder, CO (US)

(*) Notice: Subject to any disclaimer, the term of this patent is extended or adjusted under 35 U.S.C. 154(b) by 201 days.

(21) Appl. No.: 09/584,816

(22) Filed: May 31, 2000

(51) Int. Cl.[7] ................................................. H01H 3/26
(52) U.S. Cl. .................... 307/140; 324/76.11; 324/713; 307/31
(58) Field of Search .......................... 307/140; 324/126, 324/704, 713, 76.11, 76.39

(56) References Cited

U.S. PATENT DOCUMENTS

| | | | |
|---|---|---|---|
| RE31,450 E | | 11/1983 | Smith |
| 5,214,962 A | * | 6/1993 | Mahrenholtz ................. 73/766 |
| 5,386,188 A | * | 1/1995 | Minneman et al. ......... 324/126 |
| 5,766,133 A | * | 6/1998 | Faisandier .................. 600/509 |
| 5,790,392 A | | 8/1998 | Eklund et al. |

FOREIGN PATENT DOCUMENTS

WO WO 00/22592 4/2000

* cited by examiner

Primary Examiner—Stephen W. Jackson
Assistant Examiner—Robert L. De Beradinis
(74) Attorney, Agent, or Firm—Faegre & Benson LLP

(57) ABSTRACT

To increase power to a measurement device, the measurement device measures a first voltage across the measurement device. The measurement device then determines an operating current based on the first voltage. The operating current is a maximum current that the measurement device draws without dropping a measurement device voltage below a threshold voltage to prevent resetting of the measurement device. The measurement device then generates a signal to change the power to use the operating current.

21 Claims, 7 Drawing Sheets

METHOD AND APPARATUS TO CONTROL POWER DRAWN BY A MEASUREMENT DEVICE

FIELD OF THE INVENTION

This invention relates to electronic components for controlling power drawn by a measurement device.

PROBLEM

It is known to use Coriolis effect mass flowmeters to measure mass flow and other information for materials flowing through a conduit in the flowmeter. Exemplary Coriolis flowmeters are disclosed in U.S. Pat. No. 4,109,524 of Aug. 29, 1978, U.S. Pat. No. 4,491,025 of Jan. 1, 1985, and U.S. Pat. No. Re. 31,450 of Feb. 11, 1982, all to J. E. Smith et al. These flowmeters have one or more conduits of straight or curved configuration. Each conduit configuration in a Coriolis mass flowmeter has a set of natural vibration modes, which may be of a simple bending, torsional or coupled type. Each conduit is driven to oscillate at resonance in one of these natural modes. Material flows into the flowmeter from a connected pipeline on the inlet side of the flowmeter, is directed through the conduit or conduits, and exits the flowmeter through the outlet side of the flowmeter. The natural vibration modes of the vibrating, material filled system are defined in part by the combined mass of the conduits and the material flowing within the conduits.

When there is no flow through the flowmeter, all points along the conduit oscillate due to an applied driver force with identical phase or small initial fixed phase offset which can be corrected. As material begins to flow, Coriolis forces cause each point along the conduit to have a different phase. The phase on the inlet side of the conduit lags the driver, while the phase-on the outlet side of the conduit leads the driver. Pick-off sensors on the conduit(s) produce sinusoidal signals representative of the motion of the conduit(s). Signals output from the pick-off sensors are processed to determine the phase difference between the pick-off sensors. The phase difference between two pick-off sensor signals is proportional to the mass flow rate of material through the conduit(s).

Materials flowing through the Coriolis flowmeter can be hazardous materials. In order to safeguard the flow of hazardous materials, there are requirements for environmental seals and hazardous area approvals. One set of requirements are Intrinsically Safe (IS) requirements which minimize risks for an electric spark that could ignite explosive gases. Therefore, designs of measurement devices that comply with IS requirements must account for a reduced amount of power provided to the measurement device.

In one prior Coriolis flowmeter, a power supply is connected to an IS barrier. The IS barrier limits the current and voltage provided to the Coriolis flowmeter. The IS barrier is connected to a sensor of the Coriolis flowmeter via a power link. One problem relates to a lead resistance of the power link. The length of the power link varies depending on how far the power supply and the IS barrier are from the sensor in the hazardous area. Increasing the length of the power link increases the lead resistance of the power link. Thus, the increased resistance of the power link reduces the power available to the transmitter and the sensor.

Another problem with the increased resistance of the power link is a resetting problem. The resetting problem occurs when too much resistance exists in the power link. When power is initially applied to the electronics part of the flowmeter, current flow through the power link is relatively low, because the electronics have not yet begun to apply power in turn to the mechanical sensor. As the electronics begins to apply power to the sensor, current flow through the power link may increase enough to decrease the input voltage to the electronics to a threshold where the electronics goes into reset, and all power draw ceases. The cycle may then repeat.

One solution for this resetting problem is a worst case usage solution. A worst case usage of current is calculated from an assumption of a worst case sensor. The maximum lead resistance is then calculated from the worst case usage of current. The maximum lead resistance limits the maximum length of the power link. However, many sensors operate normally on much less current than the worst case sensor. For example, one low power sensor operates on one tenth the current of the worst case sensor. This low power sensor could support a longer power link with more resistance than the worst case sensor. Another option of larger gauge wires, which have a lower resistance per unit distance, also do not solve the above problems due to the I/R ratio of the larger gauge wires.

SOLUTION

The invention solves the above problems and other problems by controlling the power drawn by a measurement device. The measurement device measures a first voltage across the measurement device. The measurement device then determines an operating current based on the first voltage. The operating current is a maximum current that the measurement device draws without dropping a measurement device voltage below a threshold voltage to prevent resetting of the measurement device. The measurement device then generates a signal to change the power to use the operating current.

The measurement device using this invention determines an operating current that is higher than the current for a measurement device that assumes a worst case sensor. Thus, the measurement device advantageously has more power available than the measurement device that assumes a worst case sensor. The power available is maximized for any type of sensor in the measurement device. Another advantage is the measurement device prevents resetting for a measurement device with a large lead resistance in the power link. Previously, the measurement device with a large lead resistance resets. Also, the measurement device supports a longer length of the power link than the measurement device that assumes a worst case sensor.

One aspect of the invention is a measurement device for controlling power drawn by the measurement device where the measurement device comprises a transmitter configured to measure a first voltage across the measurement device, determine an operating current based on the first voltage wherein the operating current is a maximum current that the measurement device draws without dropping a measurement device voltage below a threshold voltage to prevent resetting of the measurement device, and generate a signal to change the power to use the operating current, and a sensor connected to the transmitter and configured to draw the operating current.

Another aspect of the invention is where the transmitter is configured to apply a minimum quiescent current to the measurement device and measure the first voltage across the measurement device occurs in response to applying the minimum quiescent current.

Another aspect of the invention is where the measurement device is configured to determine a lead resistance of the measurement device and determine the operating current based on the lead resistance.

Another aspect of the invention is where the transmitter is configured to receive and process the signal to change a variable resistance to change the power.

Another aspect of the invention is where the transmitter is configured to increase a first current of the measurement device, measure a second voltage across the measurement device, determine a linear relationship of current and voltage based on the first voltage, the second voltage, and the increase in the first current, and determine the operating current based on the linear relationship and a minimum voltage to prevent resetting.

Another aspect of the invention is where the measurement device is a Coriolis flowmeter.

Another aspect of the invention is a method for controlling power drawn by a measurement device where the method comprises the steps of measuring a first voltage across the measurement device, determining an operating current based on the first voltage wherein the operating current is a maximum current that the measurement device draws without dropping a measurement device voltage below a threshold voltage to prevent resetting of the measurement device, and generating a signal to change the power to use the operating current.

Another aspect of the invention is a software product for controlling power for a measurement device where the software product comprises (1) transmitter software configured when executed by a processor to direct the processor to measure a first voltage across the measurement device, determine an operating current based on the first voltage wherein the operating current is a maximum current that the measurement device draws without dropping a measurement device voltage below a threshold voltage to prevent resetting of the measurement device, and generate a signal to change the power to use the operating current and (2) a software storage medium operational to store the transmitter software.

DESCRIPTION OF THE DRAWINGS

The present invention can be understood from the following detailed description and the following drawings.

DETAILED DESCRIPTION

Figure 1:
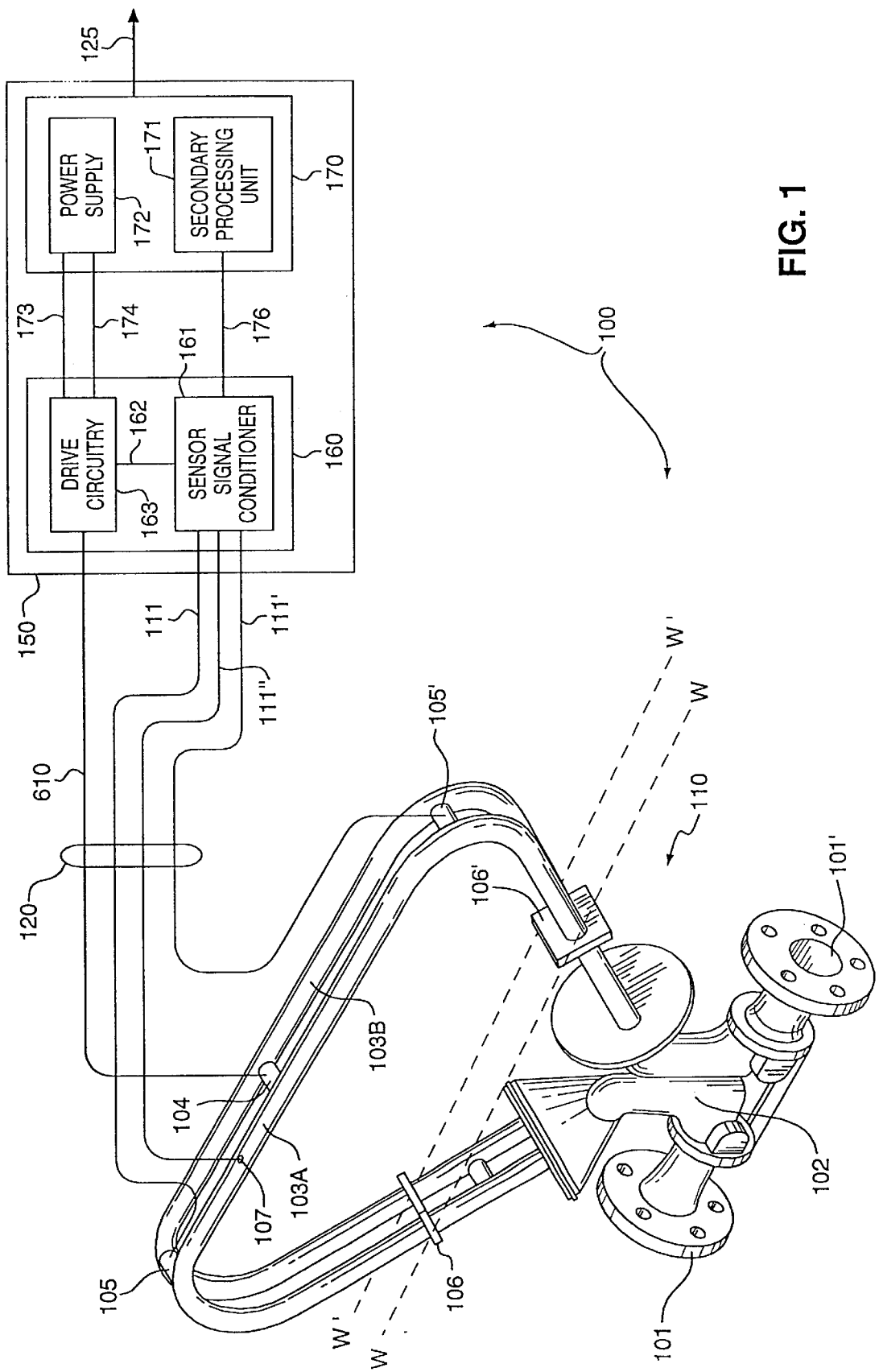
FIG. 1 illustrates a Coriolis flowmeter in the prior art.

FIG. 1 depicts an exemplary Coriolis flowmeter in the prior art. Coriolis flowmeter 100 includes a flowmeter assembly 110 and meter electronics 150. Meter electronics 150 are connected to a meter assembly 110 via leads 120 to provide for example, but not limited to, density, mass-flow-rate, volume-flow-rate, and totalized mass-flow rate information over a path 125. A Coriolis flowmeter structure is described although it should be apparent to those skilled in the art that the present invention could be practiced in conjunction with any apparatus having loads require currents of alternating voltage.

A Coriolis flowmeter structure is described although it should be apparent to those skilled in the art that the present invention could be practiced in conjunction with any apparatus having a vibrating conduit to measure properties of material flowing through the conduit. A second example of such an apparatus is a vibrating tube densitometer which does not have the additional measurement capability provided by a Coriolis mass flowmeters.

Meter assembly 110 includes a pair of flanges 101 and 101', manifold 102 and conduits 103A and 103B. Driver 104, pick-off sensors 105 and 105', and temperature sensor 107 are connected to conduits 103A and 103B. Brace bars 106 and 106' serve to define the axis W and W' about which each conduit oscillates.

When Coriolis flowmeter 100 is inserted into a pipeline system (not shown) which carries the process material that is being measured, material enters flowmeter assembly 110 through flange 101, passes through manifold 102 where the material is directed to enter conduits 103A and 103B. The material then flows through conduits 103A and 103B and back into manifold 102 from where it exits meter assembly 110 through flange 101'.

Conduits 103A and 103B are selected and appropriately mounted to the manifold 102 so as to have substantially the same mass distribution, moments of inertia and elastic modules about bending axes W—W and W'—W', respectively. The conduits 103A–103B extend outwardly from the manifold in an essentially parallel fashion.

Conduits 103A–103B are driven by driver 104 in opposite directions about their respective bending axes W and W' and at what is termed the first out of phase bending mode of the flowmeter. Driver 104 may comprise any one of many well known arrangements, such as a magnet mounted to conduit 103A and an opposing coil mounted to conduit 103B and through which an alternating current is passed for vibrating both conduits. A suitable drive signal is applied by meter electronics 150 to driver 104 via path 112.

Pick-off sensors 105 and 105' are affixed to at least one of conduits 103A and 103B on opposing ends of the conduit to measure oscillation of the conduits. As the conduit 103A–103B vibrates, pick-off sensors 105–105' generate a first pick-off signal and a second pick-off signal. The first and second pick-off signals are applied to paths 111 and 111'. The driver velocity signal is applied to path 112.

Temperature sensor 107 is affixed to at least one conduit 103A and/or 103B. Temperature sensor 107 measures the temperature of the conduit in order to modify equations for the temperature of the system. Path 111" carries temperature signals from temperature sensor 107 to meter electronics 150.

Meter electronics 150 receives the first and second pick-off signals appearing on paths 111 and 111', respectively. Meter electronics 150 processes the first and second velocity signals to compute the mass flow rate, the density, or other property of the material passing through flowmeter assembly 110. This computed information is applied by meter electronics 150 over path 125 to a utilization means (not shown).

It is known to those skilled in the art that Coriolis flowmeter 100 is quite similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the conduit to vibrate. Vibrating tube densitometers typically utilize only single feedback signal since a density measurement requires only the measurement of frequency and a phase measurement is not necessary. The descriptions of the present invention herein apply equally to vibrating tube densitometers.

In Coriolis flowmeter 100, the meter electronics 150 are physically divided into 2 components a host system 170 and a signal conditioner 160. In conventional meter electronics, these components are housed in one unit.

Signal conditioner 160 includes drive circuitry 163 and pick-off conditioning circuitry 161. One skilled in the art will recognize that in actuality drive circuitry 163 and pick-off conditioning circuitry 161 may be separate analog circuits or may be separate functions provided by a digital signal processor or other digital components. Drive circuitry 163 generates a drive signal and applies an alternating drive current to driver 104 via path 112 of path 120. The circuitry of the present invention may be included in drive circuitry 163 to provide an alternating current to driver 104.

In actuality, path 112 is a first and a second lead. Drive circuitry 163 is communicatively connected to pick-off signal conditioning circuitry 161 via path 162. Path 162 allows drive circuitry to monitor the incoming pick-off signals to adjust the drive signal. Power to operate drive circuitry 163 and pick-off signal conditioning circuitry 161 is supplied from host system 170 via a first wire 173 and a second wire 174. First wire 173 and second wire 174 may be a part of a conventional 2-wire, 4-wire cable, or a portion of a multi-pair cable.

Pick-off signal conditioning circuitry 161 receives input signals from first pick-off 105, second pick-off 105', and temperature sensor 107 via paths 111, 111' and 111". Pick-off circuitry 161 determines the frequency of the pick-off signals and may also determine properties of a material flowing through conduits 103A–103B. After the frequency of the input signals from pick-off sensors 105–105' and properties of the material are determined, parameter signals carrying this information are generated and transmitted to a secondary processing unit 171 in host system 170 via path 176. In a preferred embodiment, path 176 includes 2 leads. However, one skilled in the art will recognize that path 176 may be carried over first wire 173 and second wire 174 or over any other number of wires.

Host system 170 includes a power supply 172 and processing system 171. Power supply 172 receives electricity from a source and converts the received electricity to the proper power needed by the system. Processing system 171 receives the parameter signals from pick-off signal conditioning circuitry 161 and then may perform processes needed to provide properties of the material flowing through conduits 103A–103B needed by a user. Such properties may include but are not limited to density, mass flow rate, and volumetric flow rate.

The present invention is described more fully hereinafter with reference to the accompanying drawings, in which embodiments of the invention are shown. For instance, meter electronics 150 could be mounted integrally to flowmeter assembly 110. Those skilled in the art will appreciate that the invention may be embodied in many different forms and should not be construed as limited to the embodiments set forth herein; rather, these embodiments are provided so that this disclosure is thorough and complete, and fully conveys the scope of the invention to those skilled in the art. In the drawings, like numbers refer to like elements throughout.

Figure 2:
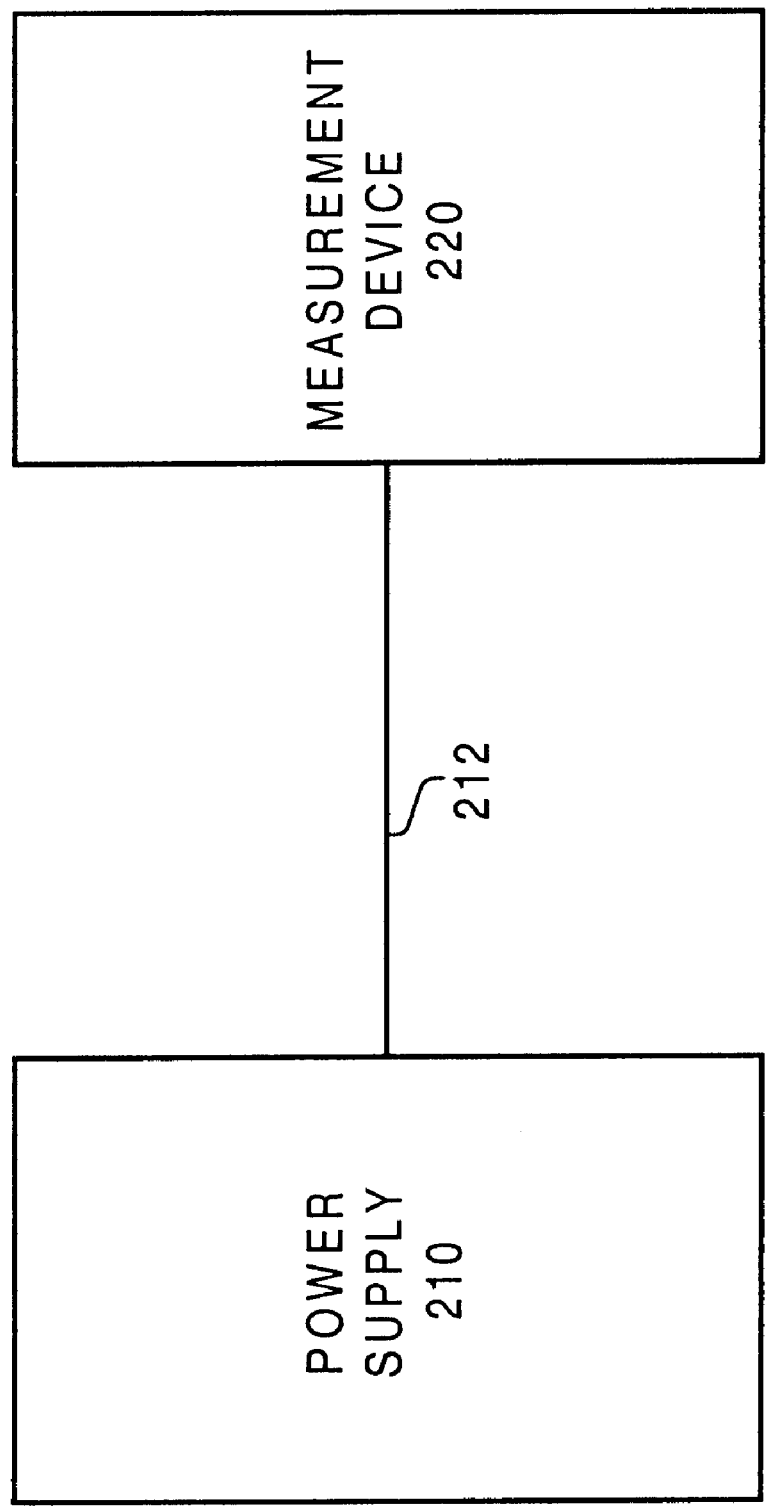
FIG. 2 illustrates a block diagram of a power supply and a measurement device in an example of the invention.

Measurement Device—FIG. 2

FIG. 2 depicts a block diagram of a power supply 210 and a measurement device 220 in an example of the invention. The power supply 210 is connected to the measurement device 220 via a power link 212.

The power supply 210 could be any power supply configured to provide power to the measurement device 220 via the power link 212. The measurement device 220 could be any device for measuring configured to (1) measure a first voltage across the measurement device 220, (2) determine an operating current based on the first voltage, and (3) generate a signal to change the power to use the operating current. The operating current is a maximum current that the measurement device 220 draws without dropping a measurement device voltage below a threshold voltage to prevent resetting of the measurement device 220. One example of the measurement device 220 is a Coriolis flowmeter device as described below in FIG. 3.

Resetting is when the measurement device 220 is powered off and then detects enough voltage to turn on. When the measurement device 220 is powered on, the current increases enough to decrease the terminal voltage to a point where the measurement device 220 powers off.

In operation, the power supply 210 provides power to the measurement device 220 via the power link 212. The measurement device 220 measures a first voltage across the measurement device 220. The measurement device 220 then determines an operating current based on the first voltage. The measurement device 220 then generates a signal to change the power to use the operating current.

Figure 3:
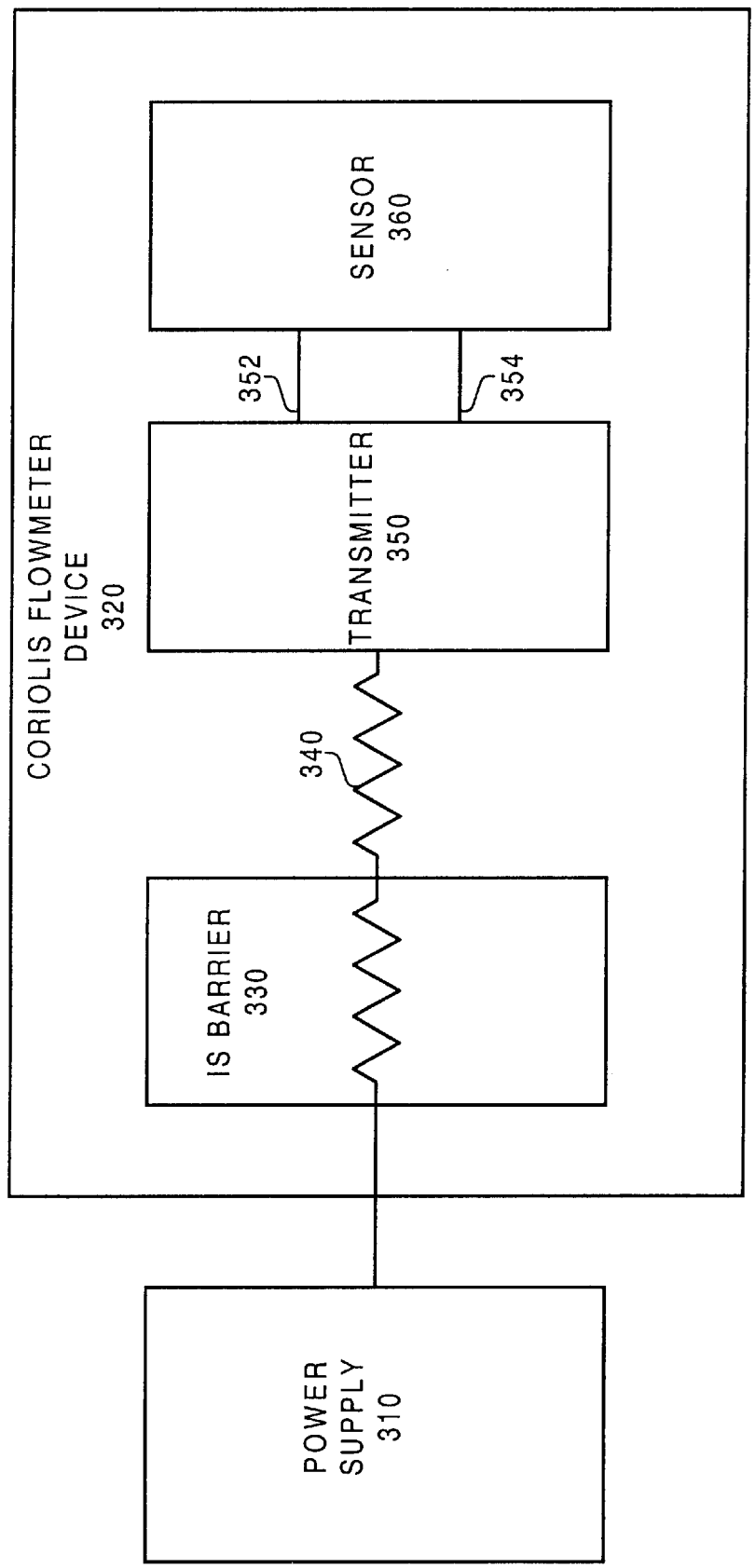
FIG. 3 illustrates a block diagram of a Coriolis flowmeter device and a power supply in an example of the invention.
Figure 4:
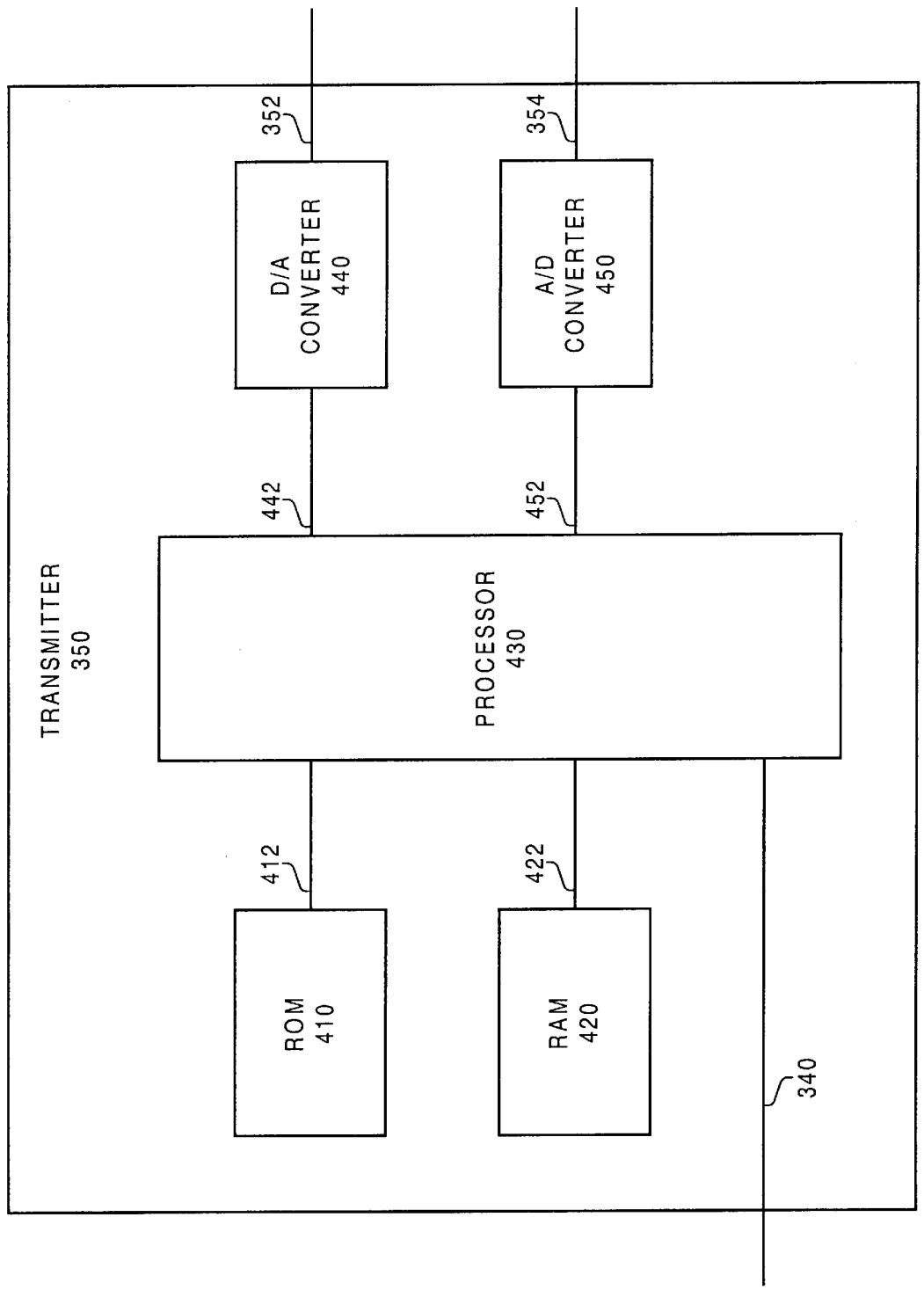
FIG. 4 illustrates a block diagram of a transmitter of a Coriolis flowmeter device in an example of the invention.
Figure 5:
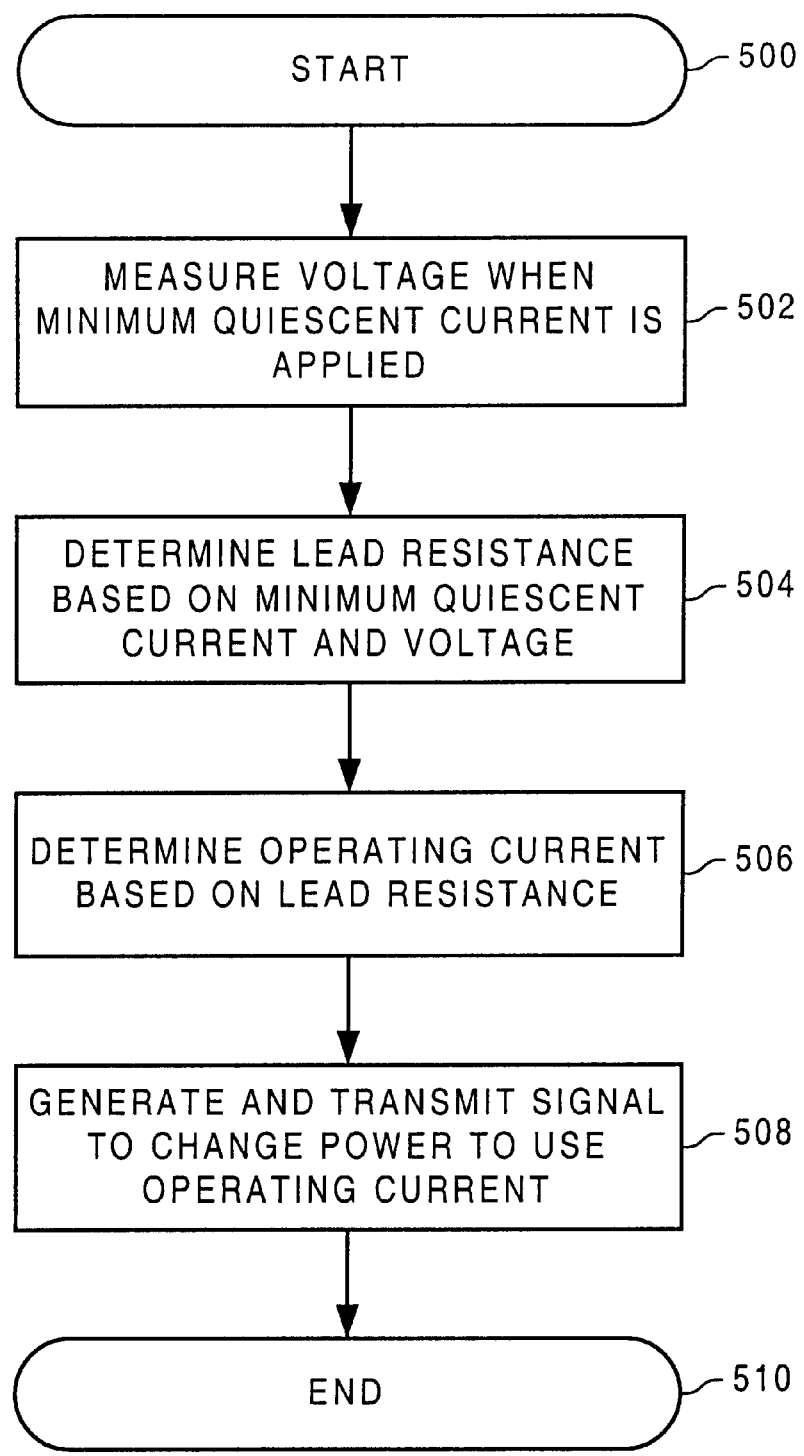
FIG. 5 illustrates a flowchart of a transmitter for calculating lead resistance in an example of the invention.

Coriolis Flowmeter Device—Intrinsically Safe—FIGS. 3–5

FIG. 3 illustrates a block diagram of a Coriolis flowmeter device 320 and a power supply 310 in an example of the invention. The Coriolis flowmeter device 320 includes an Intrinsically Safe (IS) barrier 330, a power link 340 with a lead resistance, a transmitter 350, and a sensor 360. The transmitter 350 drives the sensor 360 with drive signals via a drive link 352. The sensor 360 is an electromechanical device attached to the Coriolis flow tube. As material flows through the flow tube, the transmitter 350 receives resultant signals from the sensor 360 via a pick-off link 354. The mass flow, density, and temperature are then derived from the resultant signals.

FIG. 4 depicts a block diagram of a transmitter 350 of a Coriolis flowmeter device 320 in an example of the invention. The transmitter 350 includes a Read Only Memory (ROM) 410, a Random Access Memory (RAM) 420, a processor 430, a Digital to Analog (D/A) converter 440, and an Analog to Digital (A/D) converter 450. The ROM 410 is connected to the processor 430 via a ROM link 412. The RAM 420 is also connected to the processor 430 via a RAM link 422. The processor 430 is connected to the power link 340. The processor 430 is connected to the D/A converter 440 via a drive link 442 and is connected to the A/D converter 450 via a pick-off link 452. The D/A converter 440 is connected to the drive link 352. The A/D converter 450 is connected to the pick-off link 354. In other embodiments, there may be numerous pick-off links and A/D converters to receive signals from the sensor 360 but are not discussed here for the sake of simplicity.

FIG. 5 depicts a flowchart of the transmitter 450 for calculating lead resistance in an example of the invention. FIG. 5 begins in step 500. In step 502, the processor 430 measures the voltage across the power link 340 when a minimum quiescent current is applied. There are numerous places where the voltage could be measured across the transmitter 350 to eventually determine the operating current. Some examples are the power link 340 and the IS barrier 330. The minimum quiescent current is the minimum current to turn on the drive circuitry of the sensor 360. In step 504, the processor 430 then determines the lead resistance of the power link 340 using Ohm's law, the minimum quiescent current, and the voltage measured in step 502. In step 506, the processor 430 determines the operating current based on the lead resistance, the resistance of the sensor 360, and the voltage of the power supply 310. The processor 430 then generates and transmits a signal to change the power to use the operating current in step 508. In one embodiment, the signal may alter a variable resistance, whether passive or solid-state, to change the power to use the operating current. In an alternative embodiment, the power supply 310 receives and processes the signal to change the power to use the operating current. FIG. 5 ends in step 510.

Coriolis Flowmeter Device—Non-Intrinsically Safe— FIGS. 3, 4, and 6–7

Figure 6:
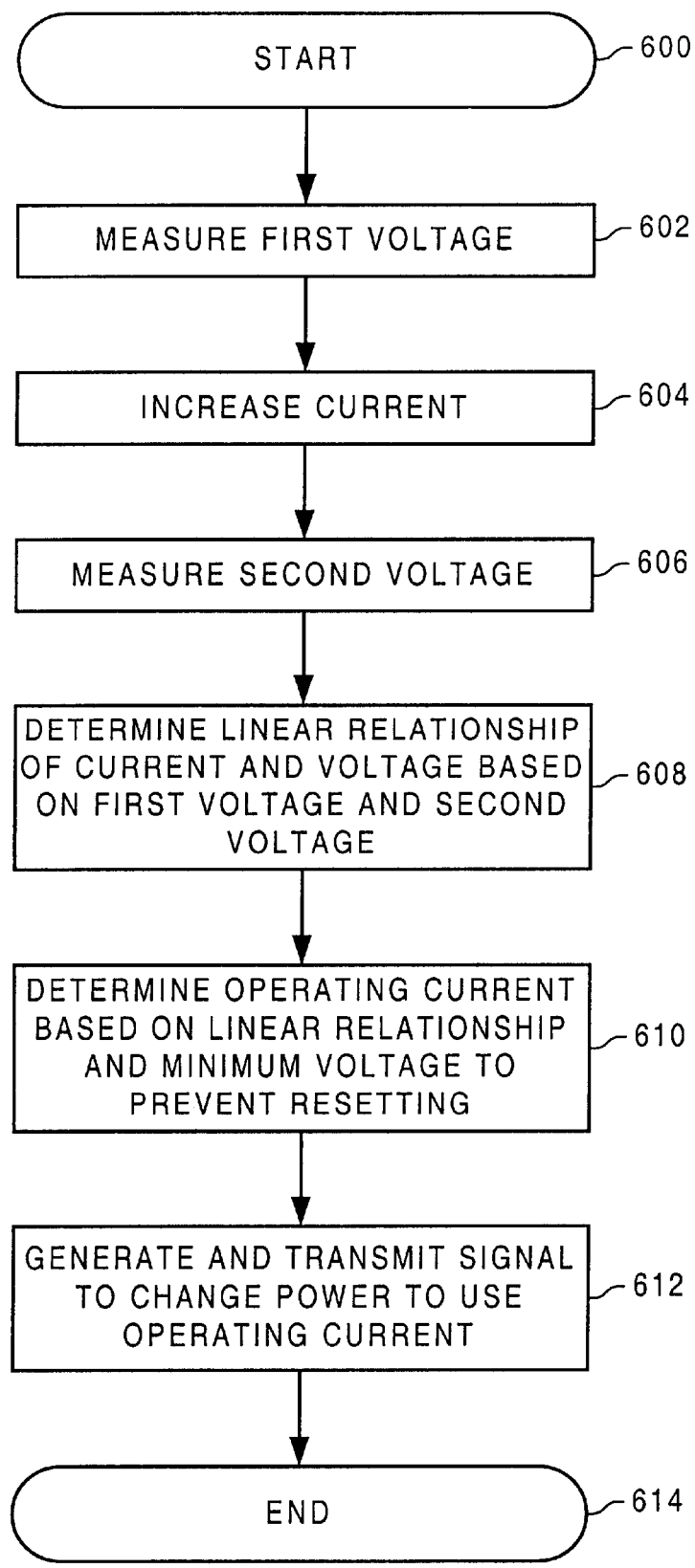
FIG. 6 illustrates a flowchart for a transmitter for determining a linear relationship of voltage and current in an example of the invention.
Figure 7:
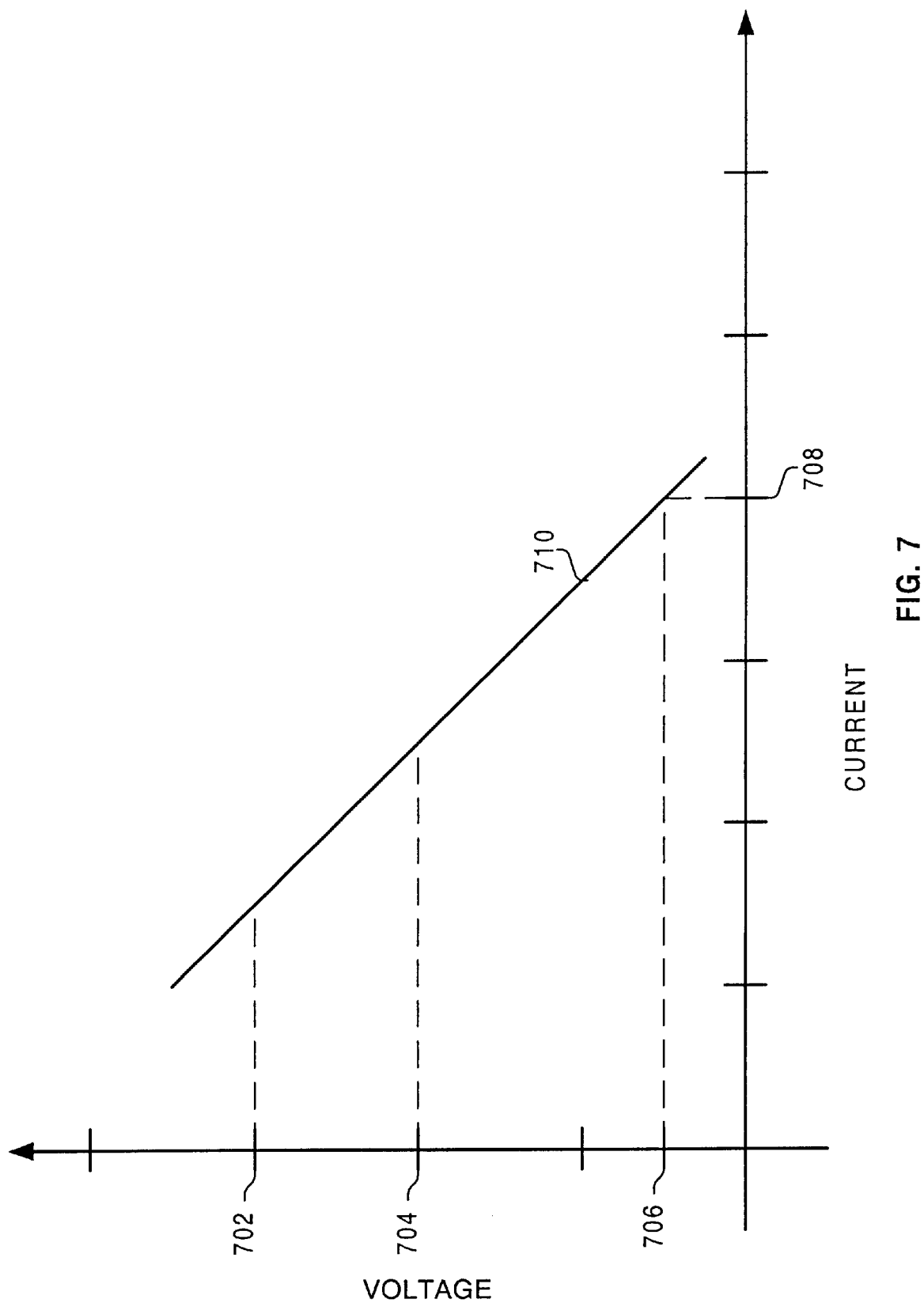
FIG. 7 illustrates a graph of current vs. voltage in an example of the invention.

In one non-intrinsically safe embodiment of the invention, the Coriolis flowmeter device 320 in FIG. 3 does not include the IS barrier 330. FIG. 6 depicts a flowchart for the transmitter 350 for a linear relationship of voltage and current in an example of the invention. FIG. 7 depicts a graph of current vs. voltage in an example of the invention. FIG. 6 begins in step 600. In step 602, the processor 430 measures a first voltage 702 at the pick-off link 452. The processor 430 then generates and transmits an increase signal to increase the current in step 604. The processor 430 then measures a second voltage 704 in step 606.

In step 608, the processor 430 then determines a linear relationship 710 of current and voltage based on the increase in current, the first voltage 702, and the second voltage 704. In step 610, the processor 430 determines the operating current 708 based on the linear relationship 710 and the minimum voltage 706 to prevent resetting. The processor 430 then generates and transmits a signal to change the power to use the operating current in step 612. FIG. 6 ends in step 614.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for controlling power drawn by a measurement device, the method comprising the steps of:
   measuring a first voltage across the measurement device;
   determining an operating current based on the first voltage wherein the operating current is a maximum current that the measurement device draws without dropping a measurement device voltage below a threshold voltage to prevent resetting of the measurement device; and
   generating a signal to change the power to use the operating current.

2. The method of claim 1 further comprising the steps of:
   applying a minimum quiescent current to the measurement device;
   measuring the first voltage across the measurement device occurs in response to applying the minimum quiescent current.

3. The method of claim 1 further comprising the steps of:
   determining a lead resistance of the measurement device; and
   determining the operating current based on the lead resistance.

4. The method of claim 1 further comprising the step of receiving and processing the signal to change a variable resistance to change the power.

5. The method of claim 1 further comprising the step of receiving and processing the signal in a power supply to change the power.

6. The method of claim 1 further comprising the steps of:
   increasing a first current of the measurement device;
   measuring a second voltage across the measurement device;
   determining a linear relationship of current and voltage based on the first voltage, the second voltage, and the increase in the first current; and
   determining the operating current based on the linear relationship and a minimum voltage to prevent resetting.

7. The method of claim 1 wherein the measurement device is a Coriolis flowmeter.

8. The method of claim 1 wherein the measurement device includes a transmitter and a sensor.

9. A software product for controlling power for a measurement device comprising:
   transmitter software configured when executed by a processor to direct the processor to measure a first voltage across the measurement device, determine an operating current based on the first voltage wherein the operating current is a maximum current that the measurement device draws without dropping a measurement device voltage below a threshold voltage to prevent resetting of the measurement device, and generate a signal to change the power to use the operating current; and
   a software storage medium operational to store the transmitter software.

10. The software product of claim 9 wherein the transmitter software is configured when executed by the processor to direct the processor to apply a minimum quiescent current to the measurement device and measure the first voltage across the measurement device occurs in response to applying the minimum quiescent current.

11. The software product of claim 9 wherein the transmitter software is configured when executed by the processor to direct the processor to determine a lead resistance of the measurement device and determine the operating current based on the lead resistance.

12. The software product of claim 9 wherein the transmitter software is configured when executed by the processor to direct the processor to receive and process the signal to change a variable resistance to change the power.

13. The software product of claim 9 wherein the transmitter software is configured when executed by the processor to increase a firs t current of the measurement device, measure a second voltage across the measurement device, determine a linear relationship of current and voltage based on the first voltage, the second voltage, and the increase in the first current, and determine the operating current based on the linear relationship and a minimum voltage to prevent resetting.

14. The software product of claim 9 wherein the measurement device is a Coriolis flowmeter.

15. The software product of claim 9 wherein the measurement device includes a transmitter and a sensor.

16. A measurement device for controlling power drawn by the measurement device, the measurement device comprising:
- a transmitter configured to measure a first voltage across the measurement device, determine an operating current based on the first voltage wherein the operating current is a maximum current that the measurement device draws without dropping a measurement device voltage below a threshold voltage to prevent resetting of the measurement device, and generate a signal to change the power to use the operating current; and
- a sensor connected to the transmitter and configured to draw the operating current.

17. The measurement device of claim 16 wherein the transmitter is configured to apply a minimum quiescent current to the measurement device and measure the first voltage across the measurement device occurs in response to applying the minimum quiescent current.

18. The measurement device of claim 16 wherein the transmitter is configured to determine a lead resistance of the measurement device and determine the operating current based on the lead resistance.

19. The measurement device of claim 16 wherein the transmitter is configured to receive and process the signal to change a variable resistance to change the power.

20. The measurement device of claim 16 wherein the transmitter is configured to increase a first current of the measurement device, measure a second voltage across the measurement device, determine a linear relationship of current and voltage based on the first voltage, the second voltage, and the increase in the first current, and determine the operating current based on the linear relationship and a minimum voltage to prevent resetting.

21. The measurement device of claim 16 wherein the measurement device is a Coriolis flowmeter.

* * * * *

UNITED STATES PATENT AND TRADEMARK OFFICE
CERTIFICATE OF CORRECTION

PATENT NO.   : 6,476,522 B1                                                                Page 1 of 1
DATED        : November 5, 2002
INVENTOR(S)  : Paul J. Hays, William M. Mansfield and Brian T. Smith It is certified that error appears in the above-identified patent and that said Letters Patent is hereby corrected as shown below:

Column 1,
Line 36, replace "while the phase-on the outlet side of the conduit leads the" with
-- while the phase on the outlet side of the conduit leads the --
Line 48, replace "ments are Intrinsically Safe (IS) requirements which mini-" with
--ments is Intrinsically Safe (IS) requirements which mini- --

Column 8,
Line 59, replace "sor to increase a firs t current of the measurement device," with -- sor to increase a first current of the measurement device, --

Signed and Sealed this

First Day of April, 2003

JAMES E. ROGAN
*Director of the United States Patent and Trademark Office*